April 13, 1965   H. L. PRESCOTT   3,178,001
PREDETERMINED LIMIT STOP FOR ROTARY DRIVE SYSTEM
Filed Nov. 21, 1961   2 Sheets-Sheet 1
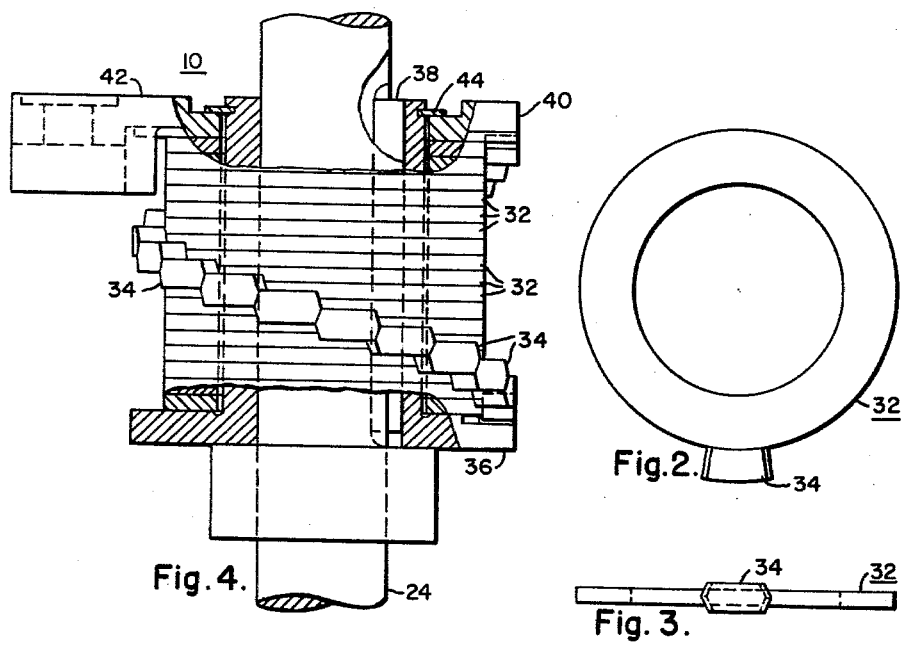
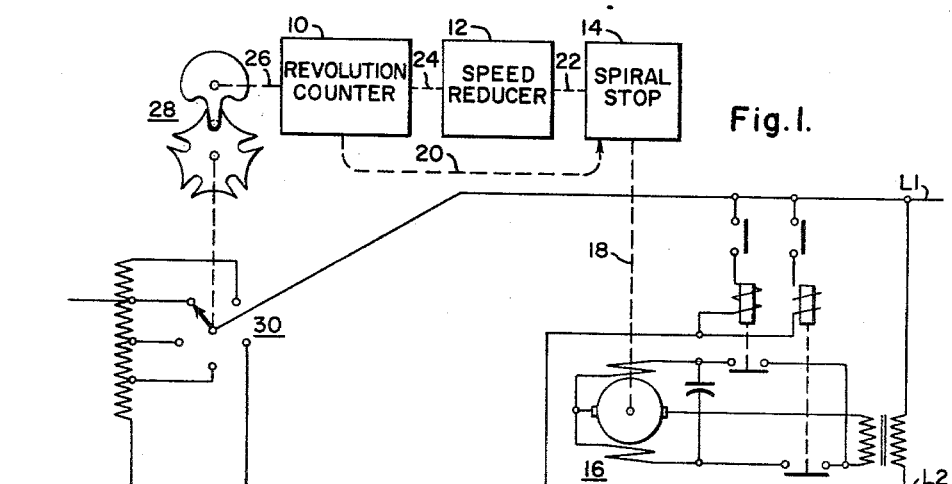
WITNESSES:
Bernard R. Gieguay
Raymond E. Cheers
INVENTOR
Herbert L. Prescott
BY
F. E. Browder
ATTORNEY April 13, 1965     H. L. PRESCOTT     3,178,001
PREDETERMINED LIMIT STOP FOR ROTARY DRIVE SYSTEM
Filed Nov. 21, 1961     2 Sheets-Sheet 2
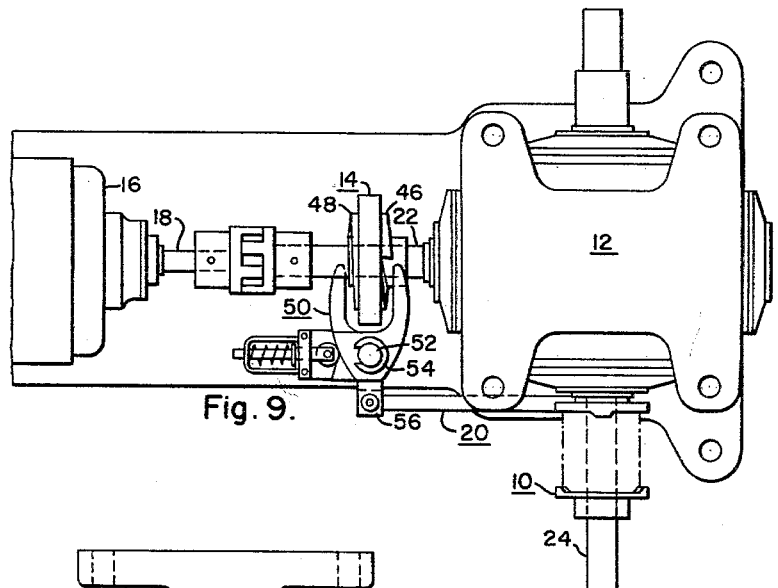
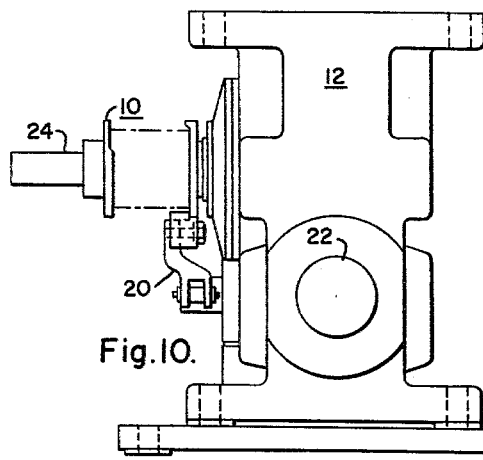
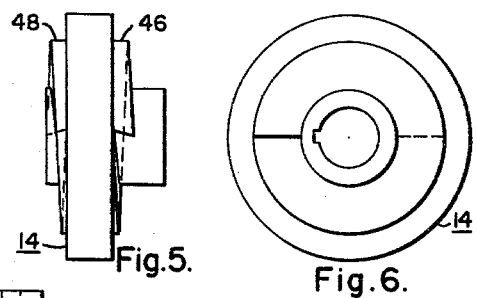
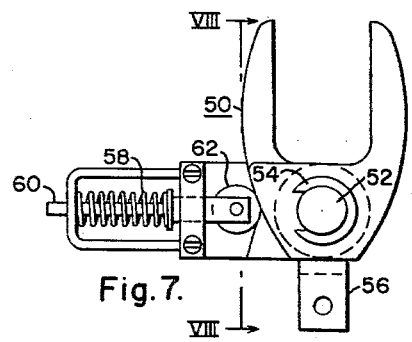
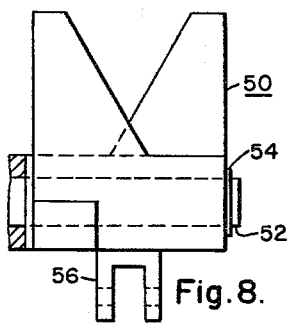

United States Patent Office 3,178,001
Patented Apr. 13, 1965

3,178,001
PREDETERMINED LIMIT STOP FOR ROTARY DRIVE SYSTEM
Herbert L. Prescott, South Pymatuning Township, Mercer County, Pa., assignor to Westinghouse Electric Corporation, East Pittsburgh, Pa., a corporation of Pennsylvania
Filed Nov. 21, 1961, Ser. No. 153,954
3 Claims. (Cl. 192—139)

This invention relates generally to drive systems and more particularly to means for limiting the operation of the drive system between predetermined limits.

Drive systems for certain types of apparatus, such as selector switches for tap changing transformers, must be limited to a predetermined distance of travel to ensure the safety of personnel and to prevent serious damage to the apparatus due to overtravel of the drive system.

Conventionally, tap changer drive systems use a mechanical stop driven by a gear train to overcome the problem of overtravel of the drive system. This type of stop is subject to considerable backlash and has many points for possible mechanical failure. Another method used to overcome the problems of overtravel in a drive system is to provide a clutch means between the driving means and the driven mechanism which is disengaged when the predetermined limits of travel are reached. A disadvantage of this type of system is that the clutch means and its associated actuating means must be manually reset after the clutch means has been actuated or a complex mechanical reset means must be provided to automatically reset the clutch and associated actuating means.

Accordingly, it is the general object of this invention to provide a new and improved mechanical stop for a drive system operating over a predetermined limited range.

It is a more particular object of this invention to provide a new and improved mechanical stop means for a drive system that requires substantially no gearing or clutch mechanism other than a speed reducer in the drive system.

Briefly, the above cited objects are accomplished by providing a mechanical stopping means, on a high-speed low-torque shaft of a speed reducer included in the drive system, which is actuated by a mechanical actuating link responsive to a revolution counter connected to a low-speed high-torque shaft of the speed reducer.

Further objects and advantages of the invention will become apparent as the following description proceeds and features of novelty which characterize the invention will be pointed out in particularity in the claims annexed to and forming a part of this specification.

For a better understanding of the invention, reference may be had to the accompanying drawings, in which:

FIG. 1 is a diagrammatic view of a transformer tap changing apparatus;

FIG. 2 is a top view of a counting disc of the revolution counter;

FIG. 3 is a front view of the disc of FIG. 2;

FIG. 4 is a partial sectional front view of the revolution counter;

FIG. 5 is a front view of a spiral stop used in conjunction with this invention;

FIG. 6 is a side view of the stop of FIG. 5;

FIG. 7 is a front view of the claw used in conjunction with the spiral stop of FIGS. 5 and 6;

FIG. 8 is a side view of the claw of FIG. 7;

FIG. 9 is a plan view of the speed reducer, revolution counter, stop and claw assembly; and FIG. 10 is a right-end elevation of FIG. 9.

Referring now to FIG. 1, the diagram shows a motor 16 mechanically coupled, through the motor output shaft 18, to a speed reducer input shaft 22. A spiral stop 14 is rigidly mounted on the shaft 22 which is the high speed input shaft of the speed reducer 12. The low-speed high-torque output shaft 24 of the speed reducer 12 is coupled to a revolution counter 10. A mechanical actuating link 20 is connected between the revolution counter 10 and the spiral stop 14 to actuate the spiral stop 14 when the predetermined angle of rotation of the drive system is completed. The revolution counter output shaft 26 is directly connected to the tap changing equipment which includes the gearing means 28 and the tap changing switch 30.

The revolution counter 10 is comprised of a plurality of discs 32 as shown in FIGS. 2 and 3. Each disc 32 has a lug 34 extending radially outwardly from the ring 32. The thickness of the lug 34 is slightly less than twice the thickness of the disc 32 so that when the discs are stacked one on top of another the lugs 34 of adjacent discs 32 will not pass each other but the lugs 34 of nonadjacent discs can easily pass.

FIG. 4 is a view of the revolution counter 10 showing a plurality of the discs 32 stacked on a sleeve member 36 which is driven by the output shaft 24. The sleeve member 36 has a flange at one end with a lug thereon similar to the lugs 34 of the discs 32. The sleeve member 36 is rigidly fixed to the shaft 24 by any convenient means such as a key 38. A plurality of discs 32 are placed on the sleeve member 36. The top or last disc 40 has a lug extending therefrom similar to the lugs 34 of the discs 32. The last disc 40 also has a lever 42 extending from it to provide a connection for the mechanical actuating link 20 which actuates a spiral stop 14. The plurality of discs 32 and the disc 40 are fixed to the sleeve member 36 in the axial direction by any convenient means, for example, by a retaining ring 44 as shown in FIG. 4. The discs 32 and 40 are not fixed to the sleeve member 36 in a rotational direction, therefore, the rotational forces of the input shaft 24 are transmitted to the lever 42 only when the plurality of lugs 34 are lined up in a helical path so that each lug 34 applies a force to the lug of the adjacent disc. That is, the sleeve member 36 being fixed to the shaft 24 applies a rotational force through the plurality of lugs 34 to the top disc 40 which has the lever 42 thereon. The top disc 40 rotates causing the lever 42 to transmit the force through the actuating link 20 to a claw 50. The claw 50 rotates to engage the stop 14 thereby stopping the drive system.

FIGS. 5 and 6 are views of the spiral stop 14. The stop 14 is rigidly fixed to the high-speed low-torque speed reducer input shaft 22, for example, by a key. Each face of the substantially disc-shaped stop 14 is provided with a projection 46 and 48. The fork or claw 50 (shown in FIGS. 7 and 8) is positioned so that the stop rotates between the legs of the claw 50. The claw 50 when properly actuated engages the extending portion of the projection 46 when the stop 14 is rotating in one direction to thereby mechanically stop the drive system. When the stop 14 is rotating in the opposite direction the other end of the claw 50, when actuated, engages the projection 48 to thereby stop rotation of the drive system in that direction. When the claw 50 and stop 14 are engaged, to course, the drive system cannot be rotated in one direction but can freely rotate in the opposite direction without being reset. When the drive system is rotated in the opposite direction, the claw 50 is returned to a neutral position by a biasing means.

The claw 50 of FIGS. 7 and 8 has a hole provided for a pivot pin 52. The pivot pin 52 provides a means for mounting the claw 50 in position on the drive system and also provides a pivot point for the claw 50 to rotate around when actuated by mechanical link 20 and revolution counter 10, to thereby engage the projection of the spiral stop 14. The claw 50 is held in place on the pivot pin 52 by a locking ring 54. The claw 50 has a U-shaped member 56 extending below the pivot pin 52 for the attachment of the actuating link 20.

A biasing means comprising a spring 58, a rod 60, and a roller or wheel 62 is provided to prevent the claw 50 from engaging the spiral stop 14 in the absence of a force from the revolution counter 10 through the actuating link 20 to the U-shaped member 56 of the claw 50. The biasing spring 58 returns the claw to a neutral position when the actuating force is removed by rotation of the drive system in the opposite direction.

The pivot pin 52 and the biasing means are rigidly mounted on the base frame on which the entire mechanism is mounted.

FIG. 9 is a plan view of the drive system assembly. That is, the motor 16 is shown coupled through its output shaft 18 to the speed reducer input shaft 22. The spiral stop 14 is fixed to the input shaft 22 of the speed reducer 12. The revolution counter 10 is fixed to the speed reducer output shaft 24. The mechanical actuating link 20 mechanically couples or connects the revolution counter 10 to the U-shaped member 56 of the claw 50.

FIG. 10 is a right-end elevation of FIG. 9 showing the speed reducer 12, the revolution counter 10, shaft 24 and actuating link 20.

Some of the advantages of the described drive system are the position of the revolution counter on the low speed shaft and the location of the stop on the low torque shaft. This, of course, makes the counting and stopping easier and more accurate. Another advantage of this invention is the absence of gear trains and resetting mechanism.

While there has been shown and described what is at present considered to be the preferred embodiment of the invention, modifications thereto will readily occur to those skilled in the art. It is not desired, therefore, that the invention be limited to the particular arrangements shown and described, and it is intended to cover in the appended claims all such modifications as fall within the true spirit and scope of the invention.

I claim as my invention:

1. A drive system for apparatus having a range of operation between predetermined limits comprising, a speed reducer having input and output shafts rotatable in either of two directions, a revolution counter having a driving member and a driven member mounted on and responsive to said output shaft, stopping means having projections thereon mounted on the input shaft of said speed reducer, linkage means including a claw-shaped member, the driven member of said revolution counter being actuated by the driving member when a predetermined limit is reached, the driven member of said revolution counter being connected to said linkage means, causing said claw to engage a projection on said stopping means when said driven member is actuated, and biasing means for preventing said claw from engaging a projection on said stopping means in the absence of a force from the driven member of said revolution counter, and for moving said claw from engagement with said stopping means when the input shaft of said speed reducer reverses direction.

2. A drive system for apparatus having a range of operation between predetermined limits, which is always in positive engagement and which allows the apparatus to reverse direction at will between the limits, comprising speed reducer means having input and output shafts rotatable in either of two directions, driving means connected to said input shaft for driving said speed reducer means in either of two directions, stopping means mounted on the input shaft of said speed reducer means, counting means having a driving member and a driven member, said counting means being mounted on the output shaft of said speed reducer means, with the driving member being responsive to the revolutions of said output shaft, and the driven member being actuated by the driving member when the predetermined limits are reached, and linkage means connected between said stopping means and the driven member of said counting means, including a claw member for positively engaging said stopping means and stopping said driving means when the driven member of said counting means is actuated, said stopping means including biasing means for moving said claw member from positive engagement with said stopping means to a neutral position when said driving means reverses direction.

3. A drive system for apparatus having a range of operation between predetermined limits, which is always in positive engagement and which allows the apparatus to reverse direction at will between the limits, comprising a speed reducer having input and output shafts rotatable in either of two directions, driving means connected to said input shaft for rotating said speed reducer in either of two directions, stopping means mounted on the input shaft of said speed reducer, said stopping means comprising a disc-shaped member having a projection on each side thereof, counting means having a driving member, a plurality of rotatable discs each having a projecting lug thereon, and a driven member, said counting means being mounted on the output shaft of said speed reducer, with the driving member being responsive to the revolutions of said output shaft to successively turn said rotatable discs, with the projecting lug on one disc engaging the projecting lug on an adjacent disc, said driven member being actuated by the driving member when all projecting lugs of said plurality of discs are engaged, which occurs when the predetermined limits are reached, and linkage means connected between said stopping means and the driven member of said counting means, including a claw-shaped member having projecting legs positioned to allow said stopping means to rotate freely between said legs, said claw-shaped member being actuated when the driven member of said counting means is actuated, moving one of its projecting legs into positive engagement with one of the projections of said stopping means to stop the rotation of said driving means, said linkage means including biasing means for moving said claw-shaped member out of positive engagement with said stopping means when said driving means reverses its direction of rotation.

References Cited by the Examiner

UNITED STATES PATENTS

| 857,550 | 6/07 | Dillon | 192—141 |
| 1,699,785 | 1/29 | Geiger et al. | |
| 2,727,613 | 12/55 | Radkowski | 192—138 |
| 2,907,225 | 10/59 | Pischke | 192—139 |

FOREIGN PATENTS

| 607,137 | 12/34 | Germany. |
| 374,170 | 6/32 | Great Britain. |

DAVID J. WILLIAMOWSKY, *Primary Examiner.*

THOMAS J. HICKEY, *Examiner.*